Aug. 2, 1960   N. SZASZ   2,947,484
METHOD AND APPARATUS FOR MILLING FLOUR
Filed May 22, 1958   7 Sheets-Sheet 1

INVENTOR.
NANDOR SZASZ
BY *Katherine Szasz*
ADMINISTRATRIX
*William C. Babcock*
ATTORNEY Aug. 2, 1960 N. SZASZ 2,947,484
METHOD AND APPARATUS FOR MILLING FLOUR
Filed May 22, 1958 7 Sheets-Sheet 6

INVENTOR.
NANDOR SZASZ
BY Katherine Szasz
ADMINISTRATRIX
William C. Babcock
ATTORNEY

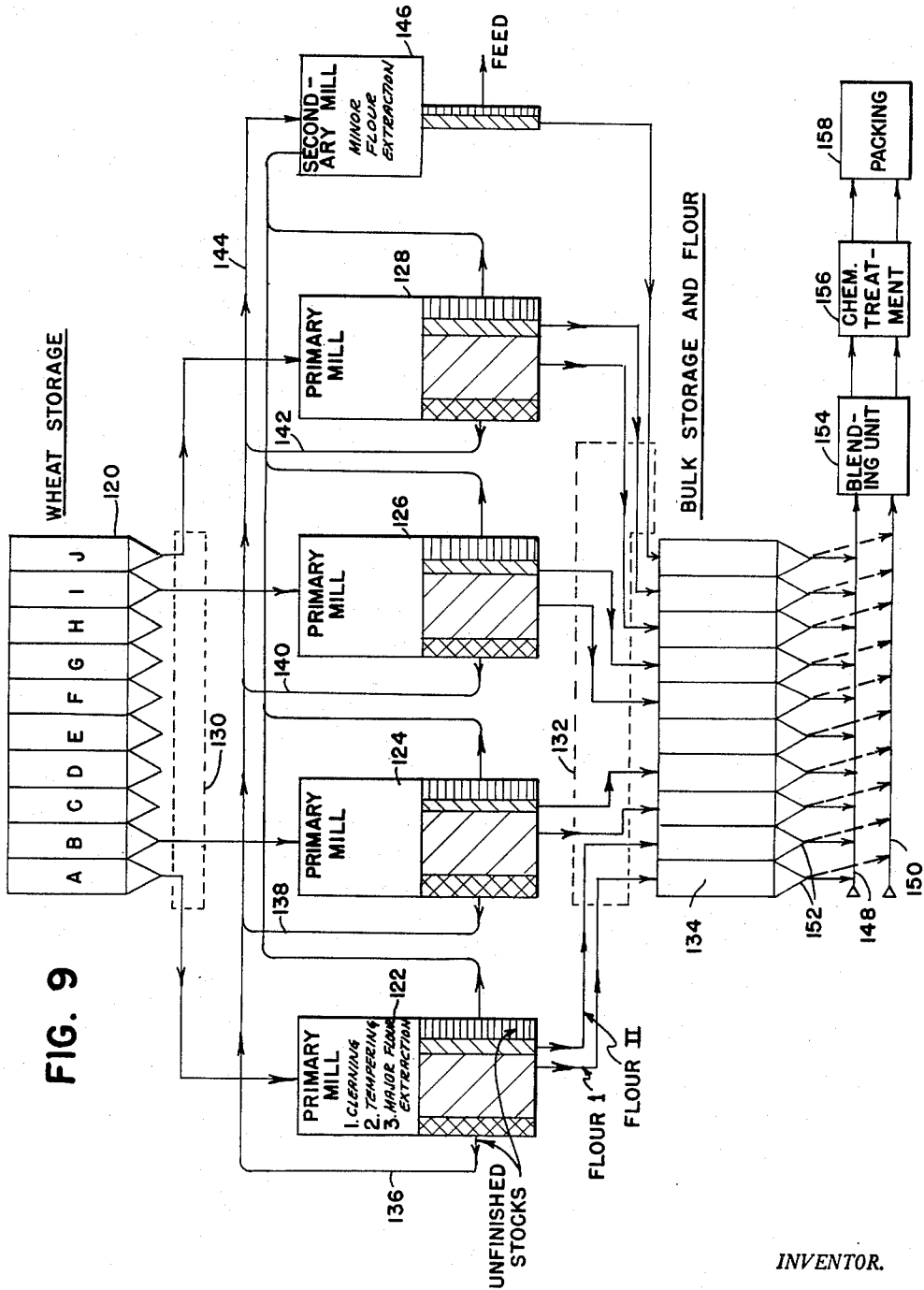

United States Patent Office 2,947,484
Patented Aug. 2, 1960

2,947,484
METHOD AND APPARATUS FOR MILLING FLOUR

Nandor Szasz, deceased, late of Minneapolis, Minn., by Katherine Szasz, special administratrix, Minneapolis, Minn., assignor to General Mills, Inc., a corporation of Delaware Filed May 22, 1958, Ser. No. 737,131

35 Claims. (Cl. 241—10)

The present invention relates to the milling of flour from cereal stocks and more specifically to improve methods and apparatus for such milling.

In modern milling history it has been customary to utilize what is known as a "gradual reduction" milling process in which the grain is passed successively through a series of breaking and reduction operations. In most mills these breaking operations have been done on roller milling units, although some mills may utilize impact machines and methods. The breaking operations break up the wheat or other cereal grains to produce branny hull or tailings portions, flour middlings stocks and even some finished flour.

The products of the successive breaking steps are then normally classified, purified, and fed to appropriate portions of a reduction system. Typical reduction systems include a number of roller mill or impact mill units which have acquired many different names depending on the traditions and historical development in particular locations. The initial reduction steps generally include what are known as sizings operations to reduce the size of the coarser middlings without substantial production of flour. They also include middlings reduction steps under various names. Whatever the names involved, the purpose of the reduction system is ultimately to obtain flour from the middlings stock produced in the breaking operations, and to separate such flour from any remaining hull or branny portions.

Modern mills make extensive use of air purifiers which combine a sifting and air classification operation to remove bran and other impurities from the middlings stock formed in the breaking operation. Such purifiers have customarily been used in increasing numbers, depending on the complexity of the mill, between the various breaking steps and sizings and middlings reductions, and between the sizings reductions and the further middlings reduction steps. Thus it is customary to classify or grade the middlings formed at the breaking steps, send different grades to different purifiers to remove branny particles, carry the larger purified middlings to sizings rolls to obtain smaller middlings without much flour, and then purify the material from the sizings rolls before feeding the purified stock to further reduction rolls. Finer middlings from the breaking operations are often purified and then sent to appropriate middlings reduction rolls without an intermediate sizings reduction.

With the economic pressures for larger and larger mills and for additional processing to extract higher percentages of flour, the complexity of modern milling processes has increased to the point where a modern flour mill customarily includes anywhere from over one hundred to over two hundred different product streams which are subjected to many different operations on breaking or reduction units, sifters, purifiers, and the like. Efforts to extract higher and higher percentages of the original wheat or grain as flour have led to longer and more complex flows, as various intermediate streams are subjected to further treatment to separate the bran and impurities from the desired flour or endosperm particles. The emphasis on greater extraction of higher quality patent flour has led to use of more purifiers and repurifiers and further increased the complexity of the process and the number of streams to be handled.

Mills which incorporate such flows will thus ordinarily have a large number of rolls or other breaking units for the first breaking operation step of the milling process. The products discharged at this first break operation are then collected, fed to another floor of the mill and redistributed among a number of sifting units to grade them into their respective fractions, such as bran or tailings, flour middlings, and even some finished flour. The middlings thus segregated are usually divided according to size and fed to different purifiers. The coarser purified middlings from the different purifiers are then fed to sizings rolls, further purifiers, and finally to a plurality of further reduction rolls or units, depending on their size.

A given flour stream that is finally produced from the reduction system may have resulted from as many as twenty or thirty successive operating steps. The material from which such flour is derived will ordinarily have been transported great distances both laterally and vertically in a multi-story mill building and thus subjected to substantial handling, with resulting attrition and drying.

With such complex processing flows, it is extremely difficult for any but the most experienced miller to know at what point to make an adjustment to achieve a desired balance for the mill, or to single out any one source of difficulty if the final product streams do not meet the established standards of quality or quantity.

Finally, manufacturers of milling equipment have produced individual operating units, such as roller mills, purifiers, sifters, and the like, which have very limited size and capacity. Thus, when a mill of large capacity is desired, it is necessary, as noted above, to provide a large number of individual units at each operating step, to collect the material discharged by all of the units of a given step, and to redistribute the collected material among the many different units at the next operating step. Such a system thus inherently presents problems both in its proper adjustment and control, and in the excessive handling which may affect the resulting stocks.

With the above problems and disadvantages of the prior art in view, it is one object of the present invention to provide improved methods and apparatus for the milling of flour from cereal grains.

A further object is the provision of an improved milling process in which the number of milling operations and the number of streams involved may be substantially reduced without adverse effect on the total extraction of flour.

Another object is a milling process in which a simplified flow is provided for early extraction of a relatively high proportion of the total desired amount of flour in a simple and readily controlled operation.

A still further object is a milling process in which the coarsest middlings from the earlier breaking operations are promptly subjected to a first reduction step in which a substantial quantity of flour is produced.

Still another object is the provision of such a process which will produce at least as much total flour and as much or more high quality patent flour as can be produced by the best and most complex modern mills using conventional flows with air purifiers.

Another object is a milling process in which a relatively high percentage of the clean, tempered wheat weight can be extracted as good quality flour in not more than six operating steps.

A further object is an improved processing flow suitable for the milling of commercial quantities of flour and in which a given product stream from one machine unit at one stage of the process is fed to only one machine unit of a given type at the next stage of the process.

Another object is the provision of a milling unit in which clean, tempered wheat is divided among a plurality of parallel flows in each of which a given product stream from one machine unit at one stage of the process is fed to a single machine unit of a given type at the next stage of the process to provide independent parallel flows through at least the first three breaking and first three reduction steps of the process.

Still another object is the provision of such a process in which a series of primary milling units of limited individual capacity can be used to extract most of the desired flour.

A further object is an improved milling process in which reciprocating sifters are used for initial separation between the breaking steps and in which the middlings separated by such sifters may be graded and fed directly to reduction units without intermediate air purification.

A still further object is the provision of an improved method of sifting which is particularly applicable to an intermediate scalping operation between successive breaks and which can also be used between successive reduction steps.

Another object is a milling installation in which a plurality of separate, easily controlled, primary units may be used for extraction of a high percentage of high quality patent flour.

Other objects and advantages will be apparent from the following specification, in which certain preferred embodiments of the invention are described.

According to the present invention, the above objectives can be accomplished through a combination of improved processing steps and equipment, some of which are individually old in the art of flour milling. In general, the earlier extraction of a higher percentage of quality flour is made possible by shortening and simplifying the milling process. Thus the products of the successive steps in the breaking operation are at least partially classified and conveyed directly to the next breaking step, and the middlings stock formed at each breaking step is fed directly to an appropriate reduction step, without the necessity of an intermediate air purifying operation. Substantial amounts of flour are produced in the earliest reduction steps, before the stock has an opportunity to become brittle or dry through repeated handling and purification.

Thus the invention contemplates the production of flour in an amount equal to at least substantially half of the original clean tempered wheat weight, before any portion of the stock has been subjected to more than five to six operating steps, as defined herein.

In the drawings forming a part of this application,

Fig. 9 is a schematic view of a milling process and equipment installation involving a plurality of primary milling units according to the present invention.

Figure 1:
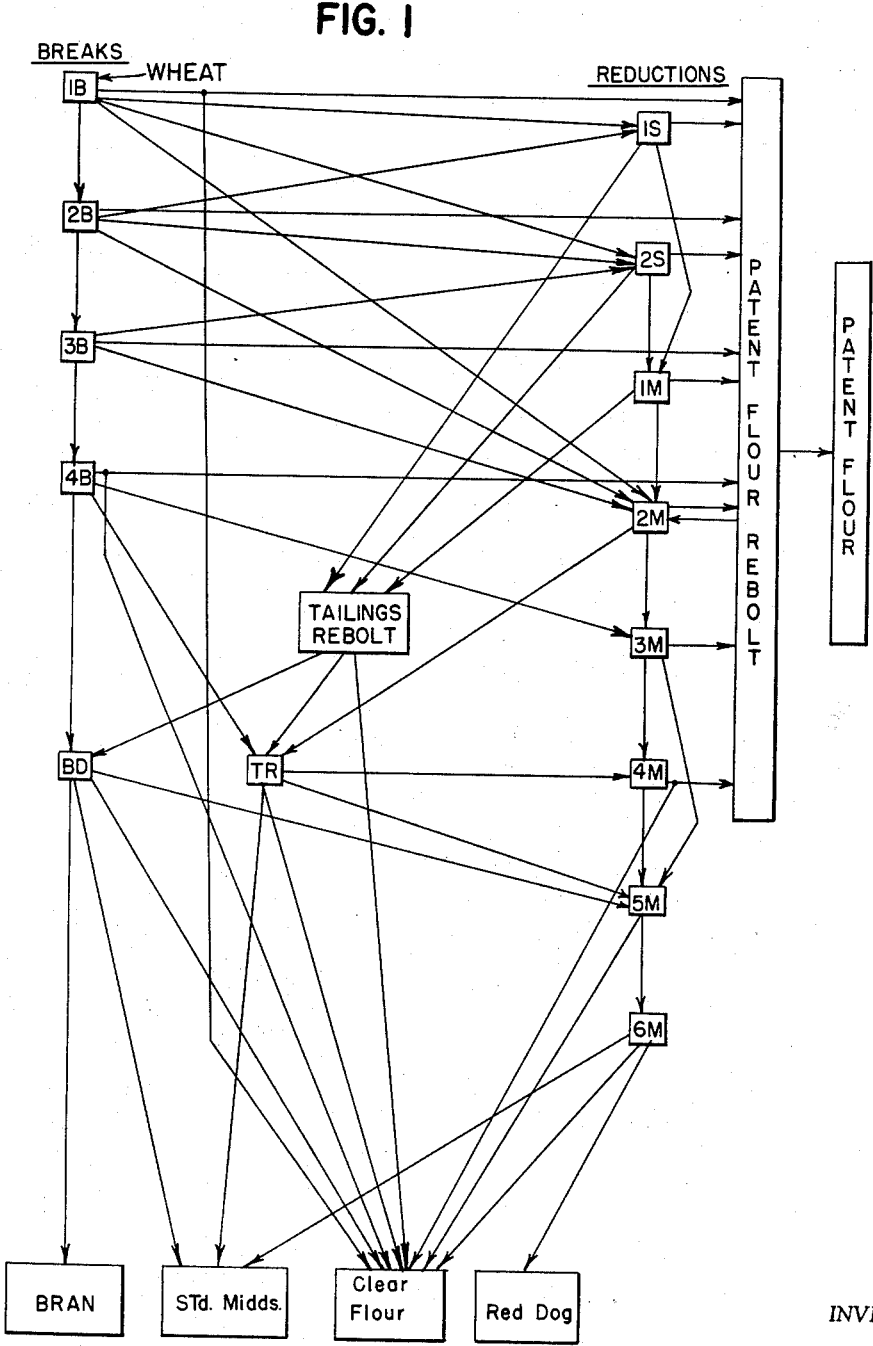
Figure 1 is a flow sheet of a simplified flour milling process according to the invention.

As set forth above, the present invention provides a shortened and simplified milling process in which the majority of the desired flour is extracted at an early stage of the process with a minimum number of operating steps. Fig. 1 is a schematic diagram of one such process according to the present invention. To avoid some of the difficulty in following a more orthodox milling flow sheet, the flow sheet of Fig. 1 omits details of the respective sifting operations associated with each breaking and reduction step. It will be understood, however, that each operating step which involves more than one stream flowing away from it is necessarily associated with a suitable classifying operation to segregate the different streams.

For example, the first breaking step or operation is illustrated at 1B in Fig. 1, with five different streams produced. The coarser branny or tailings portions, such as those passing over an 18W to 22W screen, are fed directly to the second breaking step at 2B. Three sizes of middlings are segregated and fed respectively to the first, second, and fourth steps in the reduction flow designated at 1S (first sizings), 2S (second sizings), and 2M (second middlings). These three streams may represent the overs of respective screen sizes in the following ranges: 40–50W, 7–9XX and 12–13XX. The throughs of the 12–13XX sifting surface are considered as final flour streams and may be directed either to patent flour or clear flour, depending on quality.

Similar classifications are made on appropriate screen sizes at the remaining breaking steps and at the various reduction steps. The selection of particular screen sizes for particular stocks can be made by persons skilled in the art, according to the milling characteristics of the particular grade of wheat involved.

The remainder of the flow of Fig. 1 is believed to be self-explanatory. The reduction system also includes further middlings reduction steps to produce additional flour. All the flour streams from the reduction steps down to and including 3M, the third midds reduction, may generally be fed directly to patent flour, while the flour produced at 4M, the fourth midds operation, or later operations may go to patent flour or clear flour, depending on the quality.

The material leaving the fourth and final breaking operation at 4B is suitably classified. The tailings portions are fed to a tailing roll, TR, and to a bran duster, BD, as indicated, while any remaining middlings are fed to the third middlings reduction at 3M. The flour produced at the tailings stage is ordinarily suitable for clear flour. A tailing rebolt, T Reb, is also used as shown. The final products are shown as patent flour, clear flour, bran, standard middlings and red dog.

Figure 2:
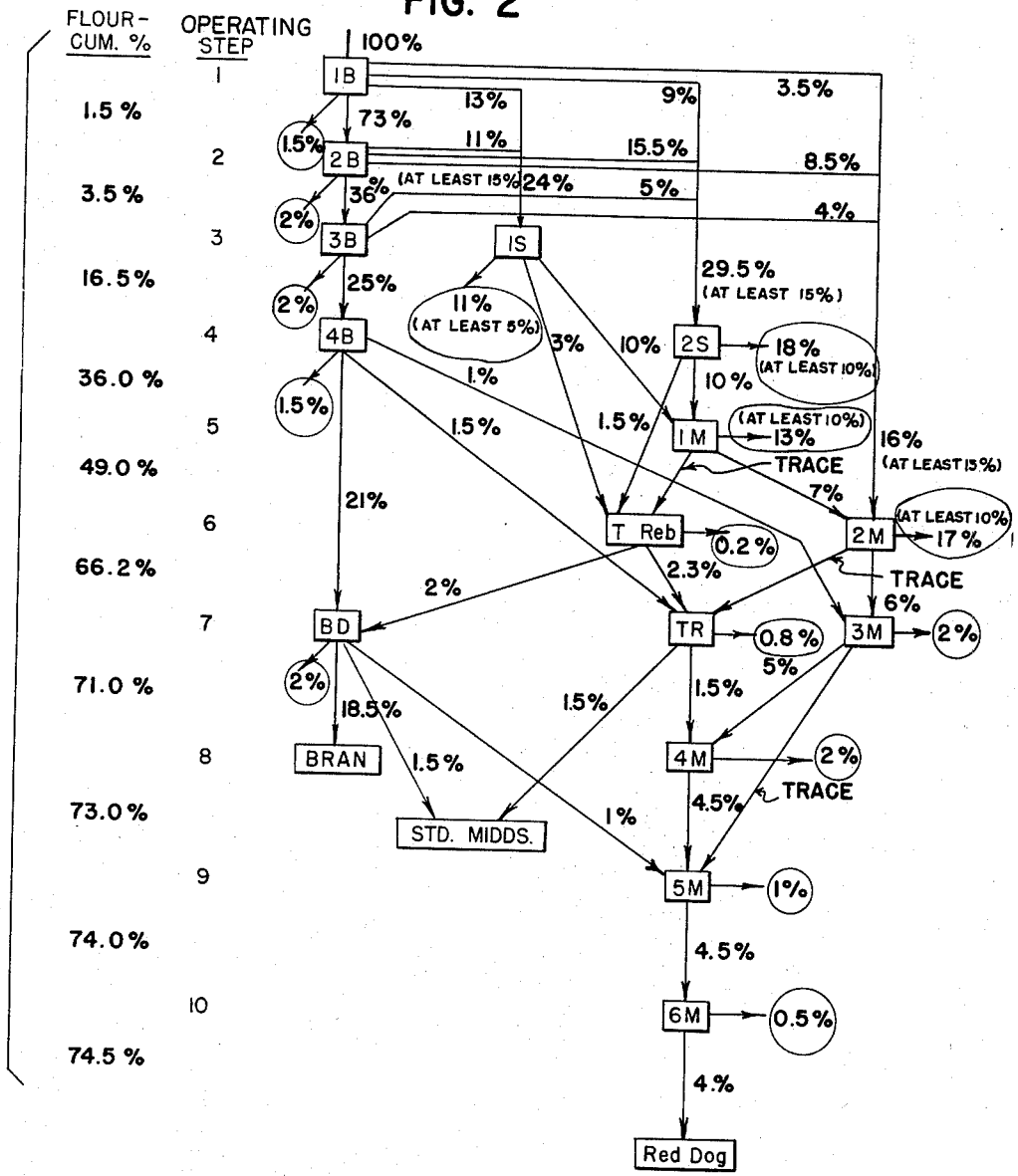
Fig. 2 is a flow sheet for a milling process identical to that of Fig. 1, but with the flow sheet arranged to show the maximum number of operating steps involved in the production of flour at various stages of the process.

Fig. 2 is a flow sheet of the identical process shown in Fig. 1, which has been rearranged according to a special convention to illustrate the manner in which the process of the present invention extracts a majority of the desired flour in a minimum number of operating steps. Here the various operations have been diagrammed opposite an index of the number of steps involved, starting with step 1 and ending with step 10. For example, all of the cleaned and tempered wheat is initially fed to the first breaking operation. Therefore, this operation is step 1 of the process.

The various operations have then been arranged on the flow sheet so that they are opposite the step number which represents that portion of the flour produced in the particular operation which has passed through the greatest number of steps before reaching that operation. For example, the first sizings reduction step (1S) is placed opposite step 3. Some of the stock which reaches this step is converted into flour with only two operations, i.e., the stock which passes through the first breaking operation and then the first sizings operation. There is, however, another portion of the stock which has passed through the first break, and the second break, before reaching the first sizings reduction. Therefore, the flour from the longest stream at first sizings will have required a total of three operating steps to produce it. This operation is accordingly placed opposite step 3 rather than step 2.

For purposes of this type of analysis, an operating step is considered as involving either a combination breaking and classifying step, a combination reduction and classifying step, or some other separate operation such as a tailings rebolting step, a bran dusting operation, a middlings purifying operation of the normal type, or the like. For convenience in this analysis, a rebolting step as applied to a final flour stream, such as a patent flour rebolt or a clear flour rebolt, is not considered a separate operating step.

Fig. 2 then indicates by percentages of original cleaned and tempered wheat weight as fed to first break the various amounts of flour produced at the respective operations from a typical test run on hard winter or bread wheat. The figures also shows the cumulative percentages of flour produced in the successive steps. Thus, the cumulative percentage at step 1 includes only the flour produced at the first breaking operation, the cumulative percentage at step 2 includes flour produced both on first and second breaks, the cumulative percentage after step 3 includes the flour produced at first, second, and third breaks and the first sizings reduction, etc.

One significant thing about this example is the fact that 49% of the clean, tempered wheat weight, i.e., essentially half of the wheat weight, is produced as flour in only five operating steps, and 66% of the clean tempered wheat weight is converted to flour in the first six operating steps. If the minor amount of flour produced on tailings rebolt is ignored, it will be noted that over 60% of the wheat weight is produced as flour with only three breaking steps and the first four middlings reduction steps. 59% of the wheat weight is produced in this case on the first four reduction steps alone. All of this flour is suitable as high-grade patent flour of equal or greater quality and lower ash content than the first 60% extracted in a conventional milling process after many more operations, as will be explained in detail below.

The remaining percentages disclosed in Fig. 2 represent the actual quantities, in terms of percent of clean, tempered wheat weight, of the various other streams in addition to the final flour streams. These percentages are given as one example of the actual carrying out of the process shown in this figure with a hard wheat and are considered adequate to teach any person skilled in the art a specific embodiment by which this invention can be practiced. While the specific percentages of individual intermediate streams may vary, they should be adjusted to produce flour in an amount equal to at least half the clean, tempered wheat weight and preferably over 60% of that weight is not more than six operating steps, preferably involving no more than three breaking steps and the first four reduction steps.

Specifically, the example of Fig. 2 also shows that flour in an amount equal to at least 5% (and in this example actually 11%) of the clean tempered wheat to first break is made in the first reduction step which receives the coarsest sizings and middlings stock from the earlier breaks (in this case from only the first and second breaks). These coarsest stocks include at least 15% (and in this case 24%) of the weight of feed to first break.

The example further shows that flour equal to at least 10% (and in this case actually 18%) of the feed to first break is produced in the second reduction step which receives the next coarsest or somewhat finer, i.e., medium middlings stock from the earlier breaks (in this case the second coarsest stock from first and second breaks and the coarsest middlings stock from third break). These medium middlings stocks include at least 15% (and in this case 29.5%) of the feed to first break.

This example also shows that flour equal to at least another 10% (and in this case 13%) of the feed to first break is produced in a third reduction step which receives at least a majority, and in this case all of the remaining middlings stock from the first two reduction steps.

Finally this example shows that flour equal to at least another 10% (and in this case 17%) of the feed to first break is produced in a fourth reduction step which receives at least the finer middlings stock from the earlier breaks (and in this case the finer middlings stocks from the first three breaks together with all of the remaining middlings from the third reduction step). These finer middlings stocks include at least another 15% (and in this case 16%) of the feed to first break. Thus the total middlings stock from the first three breaks to these four reductions is at least 45% (and in this case 69.5%) of the initial feed.

Figure 3:
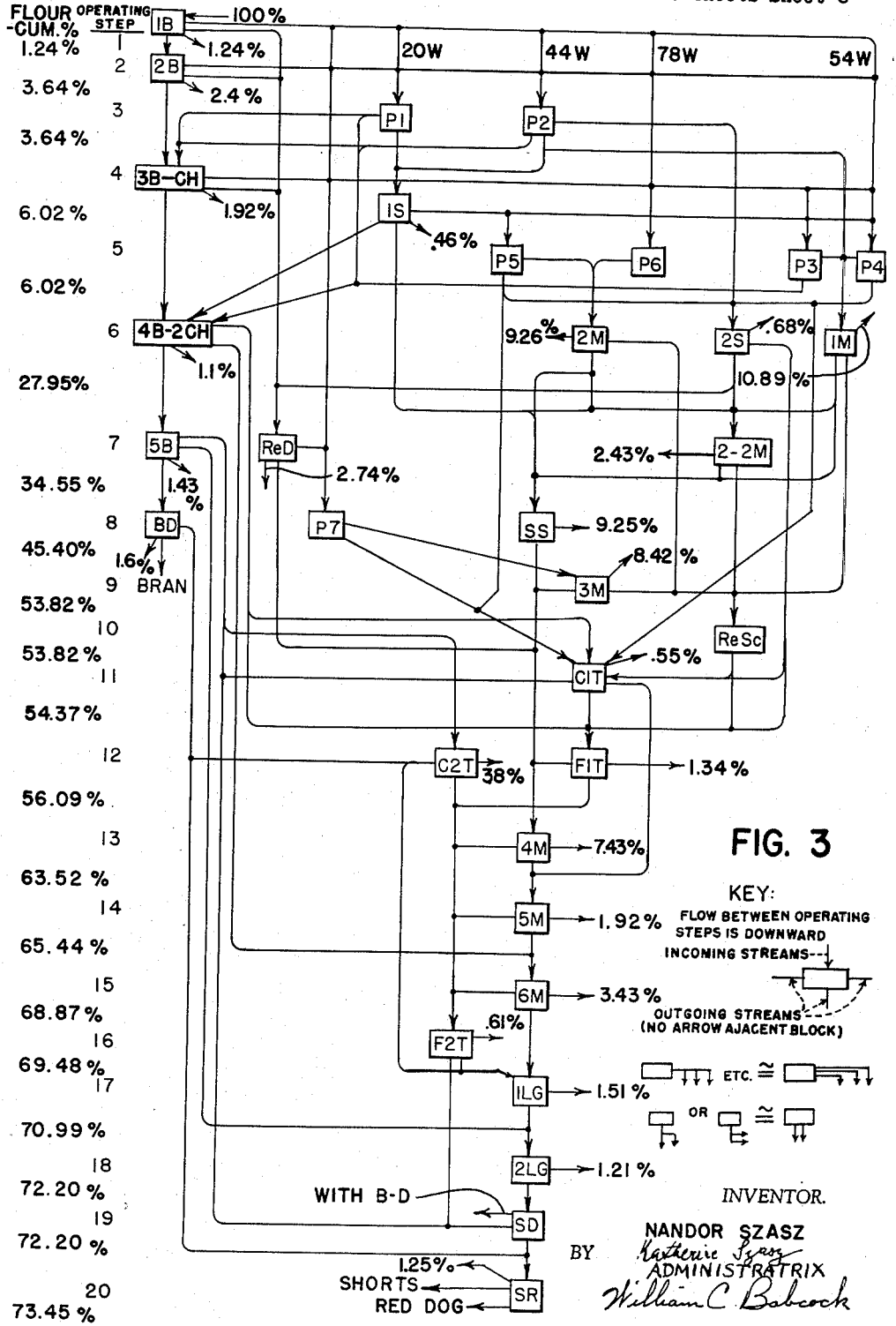
Fig. 3 is a flow sheet arranged like that of Fig. 2, which illustrates a conventional modern milling process for comparison with the present invention.

By way of comparison, Fig. 3 shows a flow sheet in terms of operating steps, similar to Fig. 2, of a conventional modern milling process for a hard bread wheat. This flow involves the use of a substantial number of air purifier operating steps and an extended and complex, but normal, breaking, reduction and tailings flow. The various operations have again been positioned opposite the operating step which represents the maximum number of steps of the longest flour stream produced in that operation. This particular flow sheet represents a modern mill having a daily capacity of substantially 1,000 cwt. (cwt.=100 lbs.). Many modern mills of greater capacity have even longer and more complex flows.

The process of Fig. 3 produces flour in the percentage quantities indicated, based on original clean, tempered wheat weight, to first break. While the amount of flour produced at the first four breaking steps is generally of the same order of magnitude as that shown in the process of Fig. 2, very little flour is produced in such an orthodox flow in the first sizings steps of the reduction system. The percentages of flour produced at the first and second middlings reduction steps are also substantially less than in the process of the present invention.

It was considered necessary, prior to this invention, to purify and repurify the sizings and middlings before they could be reduced substantially to flour. Thus, it will be noted that at the end of the first six operating steps in Fig. 3 the cumulative percentage of flour produced is only substantially 28% of the original wheat weight. Yet this point in the process of Fig. 3 includes the first four breaking operations and the first four sizings and middlings reduction operations just as in the case of the process diagram of the present invention in Fig. 2.

In effect then, the present process, as illustrated in Fig. 2, produces over twice as much flour in the first six operating steps as the conventional milling flow illustrated in Fig. 3. The invention accordingly makes it possible to do a better job of extracting high quality flour with less equipment and capital investment and with easier control than a conventional process. Reference to the balance of the flow of Fig. 3 indicates that it requires fifteen operating steps in that conventional flow before the percentage of flour extraction reaches the point achieved in only six operating steps in the flow of Fig. 2. Interestingly enough, comparison of the final figures at the end of ten steps in Fig. 2 and twenty steps in Fig. 3 indicates that the shorter flow of the present invention extracts as much total flour as the long and complex orthodox modern flow of Fig. 4.

The symbols used in Fig. 3, to the extent that they are identical to symbols used in Fig. 2, represent operating steps of the same name and type. In Fig. 3 the air purifying steps on standard middlings purifiers (which involve a combination of sifting and air separation of branny particles) are designated at P1, P2, etc. The symbol CH in the break system refers to the term "chunk," which is a name applied by some millers to tailings of certain purifiers which are ground on separate chunk rolls and may then be sifted jointly with the products of the appropriate break rolls to the particular steps in question. The following additional symbols have the meaning indicated:

SS—stone stock reduction, a middlings reduction step
2–2M—a middlings reduction step
C1T—Coarse first tailings rolls
F1T—Fine first tailings rolls
C2T—Coarse second tailings rolls
F2T—Fine second tailings rolls
1LG—First low grade flour rolls
2LG—Second low grade flour rolls
SD—Shorts duster
SR—Shorts roll
Red—Redust
ReSc—Rescalp A comparison of the flour streams in Figs. 2 and 3 further indicates the relatively simpler nature of the present process as compared to the complex conventional milling process. Thus there are only 15 flour streams in the process of Fig. 2 (i.e. the final flour streams with circled percentages) as compared to 25 flour streams in the conventional process of Fig. 3. The relative complexity of the conventional process is even greater when one considers the much larger number of intermediate streams which must be segregated and conveyed to appropriate operations.

*Examples*

As additional specific examples of the process shown in Fig. 2, a series of test runs were made in which hard red winter wheats were cleaned, tempered to a moisture content in the range from 14.8% to 15.8%, and fed in each case to a single pair of conventional 40 inch by ten inch diameter first break rolls. In this process a single pair of rolls was used at each operating step, both for breaking and reduction, and a single sifter was used at each such step. The process was carried out in these examples at an operating rate of 900–1100 cwt. per 24 hours of operation.

The following tables show the extraction of flour in percentage of clean, tempered wheat to first break, and the flour quality in terms of ash content for the first four reduction steps during six test runs on the mill flow shown in Figs. 1 and 2, with gyratory sifters after the breaking steps. These tables also show the cumulative extractions and ash for these four reductions, together with the patent flour extraction, total flour extraction and original wheat ash for the indicated tests.

| Stream | Test A | | Test B | | Test C | |
|---|---|---|---|---|---|---|
| | Percent | Ash | Percent | Ash | Percent | Ash |
| 1S Flour | 10.60 | .390 | 10.0 | .362 | 14.07 | .385 |
| 2S Flour | 12.50 | .390 | 16.4 | .348 | 17.40 | .380 |
| 1M Flour | 14.87 | .350 | 16.5 | .339 | 12.84 | .370 |
| 2M Flour | 17.29 | .380 | 16.1 | .387 | 12.94 | .400 |
| 1S+2S+1M+2M | 55.26 | .376 | 59.0 | .358 | 57.25 | .384 |
| Patent Flour | 70.06 | .400 | 70.8 | .38 | 68.8 | .405 |
| Total Flour | 75.73 | .451 | 76.4 | .43 | 74.9 | .457 |
| Wheat | 100.00 | 1.560 | 100.00 | | 100.00 | 1.55 |

| Stream | Test D | | Test E | |
|---|---|---|---|---|
| | Percent | Ash | Percent | Ash |
| 1S Flour | 9.80 | .378 | 9.50 | .380 |
| 2S Flour | 15.58 | .368 | 15.07 | .365 |
| 1M Flour | 17.65 | .325 | 15.48 | .345 |
| 2M Flour | 12.12 | .413 | 17.63 | .430 |
| 1S+2S+1M+2M | 55.15 | .366 | 57.68 | .382 |
| Patent Flour | 66.56 | .394 | 71.36 | .402 |
| Total Flour | 72.8 | .425 | 78.36 | .482 |
| Wheat | 100.00 | 1.55 | 100.00 | 1.47 |

The following tables show the same extractions as above during five test runs on the mill flow shown in Figs. 1 and 2, with reciprocating sifters after the breaking steps:

These preceding and following tables disclose typical results of many test runs which sow that the first reduction, 1S, produces flour in the range from substantially 5 to 15% of the weight of feed to first break. The second, third, and fourth reductions, 2S, 1M, and 2M, each produce flour in the range from substantially 10 to 20% of said initial feed. Moreover, the total flour produced in these four reductions (i.e. 1S plus 2S plus 1M plus 2M) is in the range from substantially 45 to 60% of said initial feed. Since the breaks in such test runs have normally produced another 5 to 10% of flour, the total flour produced in the first six operating steps is in the range from substantially half to two-thirds of the original wheat weight, generally of the order of 60% of such weight.

| Stream | Test F | | Test G | | Test H | |
|---|---|---|---|---|---|---|
| | Percent | Ash | Percent | Ash | Percent | Ash |
| 1S Flour | 6.4 | .339 | 8.5 | .35 | 7.61 | .365 |
| 2S Flour | 8.22 | .340 | 14.6 | .35 | 8.45 | .315 |
| 1M Flour | 13.04 | .321 | 10.9 | .34 | 12.75 | .330 |
| 2M Flour | 21.14 | .336 | 16.1 | .37 | 16.41 | .345 |
| 1S+2S+1M+2M | 48.80 | .334 | 50.1 | .354 | 45.22 | .339 |
| Patent Flour | 70.05 | .364 | 71.5 | .393 | 69.68 | .384 |
| Total Flour | 73.76 | .407 | 7.36 | .415 | 74.25 | .438 |
| Wheat | 100.00 | 1.51 | 100.00 | 1.64 | 100.00 | 1.70 |

| Stream | Test I | | Test J | |
|---|---|---|---|---|
| | Percent | Ash | Percent | Ash |
| 1S Flour | 4.44 | .343 | 7.60 | .378 |
| 2S Flour | 13.21 | .333 | 12.88 | .369 |
| 1M Flour | 10.07 | .324 | 10.17 | .351 |
| 2M Flour | 18.94 | .340 | 18.13 | .363 |
| 1S+2S+1M+2M | 46.66 | .335 | 48.78 | .364 |
| Patent Flour | 70.4 | .385 | 70.71 | .401 |
| Total Flour | 72.26 | .406 | 74.19 | .454 |
| Wheat | 100.00 | | 100.00 | 1.56 |

In the above examples, as already stated, a single pair of rolls was used at each operating step in combination with a single sifter for each break and reduction step. Thus the process was carried out in effect by a straight line or series flow with the particular processing machine of each step feeding its outgoing product streams to only a single operating machine of each type at the subsequent steps with very little intermediate conveying or handling. In such a straight line single series flow, it is relatively easier than in conventional processes to adjust the repective operating steps to obtain a balanced flow, and to obtain the desired extractions as indicated.

In contrast, the conventional unit on which the process shown in Fig. 3 was carried out included a plurality of units at each breaking step, the collection of similar product streams from a number of such units, and the redistribution of such streams among a plurality of processing units of a given type at the next stage. Thus the streams reaching a subsequent unit in the process have substantially lost their identity and cannot be traced to a single earlier machine to remedy any problem involving quantity or quality of such streams.

According to a further feature of the present invention it is preferable to maintain this single series flow of one processing unit at each operating step for a substantial portion of the complete process. Where greater capacity is desired, two or more separate or duplicate parallel flows should be used to maintain separate identity of stream sources throughout as many stages of the process as possible, and in any event through the first two to three breaking steps and the first sizings and middlings reduction steps.

Figure 4:
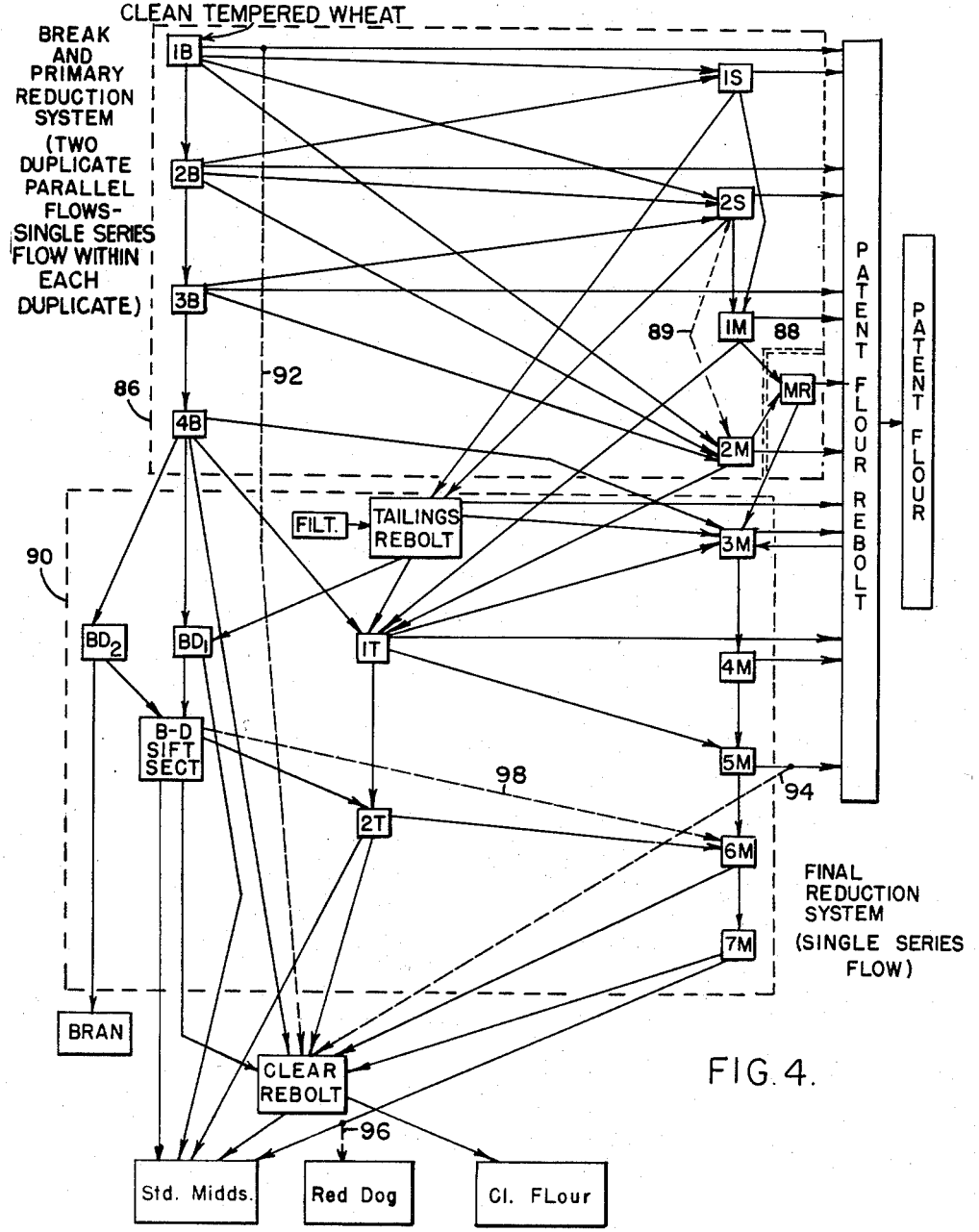
Fig. 4 is a flow sheet similar to that of Fig. 1, illustrating a preferred embodiment of this invention in which duplicate parallel flows, one of which is shown in detail, can be used for the break system and primary reduction system.

Fig. 4 shows a flow sheet for a preferred processing flow according to the present invention adapted for use in a primary milling unit of substantially 2,000 cwt. (cwt.=100 pounds) capacity per 24 hours period.

In this case the breaking operations and the earlier middlings reduction operations start out in two duplicate parallel flows, one of which is indicated in detail by the portion of the flow within the single dotted outline 86. This outline includes the four breaking steps, and first four reduction steps, which have been designated as the first and second sizings and first and second middlings reduction steps. In each of the duplicate parallel flows up to this point a single pair of break rolls is used at each breaking operation and a single pair of reduction rolls at each reduction operation.

The double dotted outline 88, enclosing the middlings rebolt step, MR, indicates that the parallel flows may be continued up to and including this operation, depending on the quantities of stock involved, if desired. The middlings rebolt step is in effect a mere extension of the normal sifting of the first and second midds stocks and may be included or omitted depending on the type and capacity of the particular sifters initially used with these stocks. If the initial sifters remove substantially all the flour, the remaining stock from first and second midds can be fed directly to 3rd midds reduction. As indicated by the double dotted outline the individual series flows may be kept separate all the way to the 3M reduction step, and the extra bolting of 1M and 2M streams could be done on separate MR sifters, one for each 1M and 2M unit.

The single dotted outline 90, which encloses the remainder of the process steps, includes the final reduction system in which there is a single series flow with only one processing unit at each operation after the 3M reduction. It may be desirable to utilize two sets of rolls for the 3M reduction, depending on the quantity of stock at this point. Thus in a sense the 3M operation might continue the separate parallel flows of the primary reduction system or serve as the point of change to a single final reduction systtem. Filter dust from any pneumatic lines or dust collectors is fed to tailings rebolt at "FILT." and a bran dust sifter section is used as shown with two bran dusters.

In this case, the duplicate parallel flows in portion 86 include at least the first four reduction steps, where the major quantity of flour is produced as described above. Thus the process of Fig. 4 includes two readily adjusted and balanced parallel flows through at least those portions of the process where most of the flour is produced, and a single, readily adjusted final reduction flow through the remaining steps of the process. The dotted flow line 89 in Fig. 4 indicates that a portion of the remaining middlings stock from the 2S reduction step may be fed to the fourth reduction step at 2M to balance the load on the 1M and 2M reductions. However, at least a majority of the middlings from the first two reduction steps at 1S and 2S will still be fed to the third reduction step at 1M.

Fig. 4 also shows certain alternate flow lines 92, 94, and 96 for the flour streams from 1B and 5M and the stream from 7M. One or more of these streams can be directed along the alternate dotted line paths in any given case where their quality or other factors would normally make such diversion desirable. The flow 98 from B—D sifter to 6M is also dotted to indicate that it may be omitted if the stock from B—D sifter does not justify this extra separation.

In both the processes of Fig. 4 and Fig. 1, it will be particularly noted that the material of a given type from a processing unit at one stage of the flow is distributed to only one processing unit of a given operation at any subsequent stage of the process. Thus if a miller detects some condition, for example, in the stock coming from the first break step to the first sizing step, he knows there is only one first break unit which is feeding that particular sizing operation. He therefore knows exactly where to go to correct the problem in the flow.

In contrast, in conventional installations where there are multiple processing units at each step of the flow, a difficulty involving the stock coming to first sizings, for example from first break, could be attributable to any one of a number of the processing units at first break. The present process thus simplifies the problem of detection and adjustment of settings and the balancing of a milling installation embodying this invention.

While some of the principles set forth in this application can be practiced with a milling installation in which standard roller milling units and gyratory or plan sifters are utilized for all or most of the breaking and reduction steps and their associated sifting operations, the present invention is particularly adaptable to a compact arrangement in which reciprocating scalpers or sifters are utilized for at least the breaking steps and preferably the breaking and first reduction steps.

The conveying and handling of the stock is best minimized by mounting a plurality of the milling units and their reciprocating sifters in a single stack or frame. Certain forms of stacked milling units have been suggested in the art, as shown for example by United States Patent 97,038 issued to G. A. Buchholz in 1869. While the possibility of using such units in flour mills of the future seems to have been recognized as recently as 1951 (see "Flour Milling Processes," by J. H. Scott, second edition, 1951, pages 613 to 633, especially pages 615 and 632), the present invention is believed to involve the first practical application of improved units of this type in a new process for high extraction of superior flour on a commercial scale.

Figure 5:
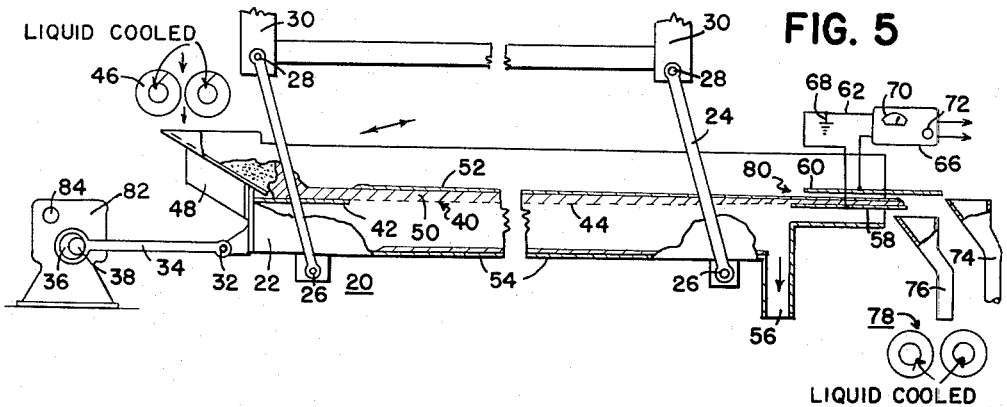
Fig. 5 is a side elevation, partly in section, of one type of sifting unit particularly adapted to the present invention, said sifting unit being located between successive breaking steps.

Fig. 5 illustrates one portion of such improved apparatus and the preferred method of operating it to perform at least the preliminary classifying steps associated with each breaking operation in the present invention. As shown in this figure, a reciprocating sifter or classifying unit 20 is located to receive the material discharged from a break milling unit, illustrated by milling rolls 46, to perform certain operations on the stock, and to feed the desired coarser tailings portion to another breaking operation indicated diagrammatically by rolls 78.

This reciprocating sifter has a body portion 22 supported by hangers 24 for back and fourth swinging movement. Hangers 24 are pivotally connected at 26 to the sifter body and are further pivoted at their upper ends 28 to suitable supporting frame members 30. The desired reciprocatory movement is obtained by connecting the sifter body 22 at 32 to one end of a connecting rod 34, the other end of which is driven by an eccentric 36 on drive shaft 38. Thus rotation of shaft 38 will transmit reciprocating movement to the sifter 22 along a relatively flat arc, the direction of which is determined by the angles of hangers 24. The hangers may be inclined as shown in Fig. 5 at a suitable angle, e.g., in the range from 0° to 15° from the vertical at their mid-stroke position, depending on the angular orientation of the sifting surface, in order to convey the stock along the classifying surface.

The stock discharged from the first break rolls 46 is guided at 48 to the first portion 42 of the classifying surface 40. This section 42 is in the form of an imperforate sheet and is designed to provide an opportunity for preliminary stratification of the stock. As the stock tends to stratify, the heavier flour middlings portions and flour particles appear to form a lower layer 50 immediately above the classifying surface and an uppermost layer 52 of larger and lighter branny hull portions.

The next portion of the classifying surface 40 is in the form of a sifting screen 44 of desired mesh. For instance, between first and second breaks the mesh may be a wire screen in the range from 18–22W (i.e. 18–22 openings per inch). As the stratified layers move across the screen portion 44, the middlings and flour particles of appropriate size are sifted from the bottom of the lower layer and are carried by a bottom plate 54 to an outlet 56 from which these particles may be fed to the next desired step. Additional lower screens may also be added for further classification of the middlings and flour before these stocks leave the classifier 20.

The stocks which pass completely over the screen surface 44 may then be fed to a further classifying surface portion 58, which is illustrated as the lower electrode of a small electrostatic separator. A suitable upper electrode 60 with collecting channels of known construction, as illustrated, for example, in Gear et al. United States Patent 2,707,556, is supported in insulated fashion above lower electrode 58. Wires 62 and 64 connect the respective electrodes 58 and 60 to an electrostatic power source 66. The lower electrode may be grounded as at 68. The power source includes a suitable meter 70 and adjusting member 72 for establishing the desired potential difference between the electrodes.

The electrostatic separator may be used to lift and separate any desired particles, such as any lighter fine branny or other particles which may have been carried in the upper strata or layer of the material being classified. Such particles may be lifted to the upper electrode 60 and collected separately at 74, as part of the desired branny or tailings feed portion or for some other purpose. The remaining stock, including both the coarser hull portions and any flour middlings stock which did not having an opportunity to pass through screen 44 will then be discharged at 76 and guided to the second breaking step at 78.

It is an important feature of the method of sifting according to this invention that the operation be controlled by proper selection of such factors as sieve area, screen mesh size, and quantity and rate of feed of the stock, including the frequency, amplitude, and direction of reciprocation as determined by hanger angles, so that the upper brannier layer or strata 52 does not come down in contact with the screen surface 44. In effect the brannier layer should be carried by an insulating intermediate layer of flour middlings portions all the way to point 80 where the stock leaves the screen 44. This sifting operation accordingly includes the possibility of preliminary stratification of the stock to provide a lower layer of flour middlings and flour particles and an upper layer of coarser branny particles or hull portions, the sifting of middlings and flour stocks from the bottom of the lower layer, and the termination of the sifting operation before the upper brannier layer can come in contact with the sifting surface and be subjected to substantial attrition to form undesired fine bran particles. Thus, as illustrated in Fig. 5, the upper layer 52 maintains a generally constant thickness as it crosses the screening surface 44, while the lower layer 50 gradually decreases in cross sectional thickness as the lower portion of it is gradually sifted down and discharged at 56.

One possible control of the sifting operation can be achieved by controlling the speed of rotation of shaft 38, and thus the frequency of reciprocating movement. Shaft 38, for example, may be driven by a power source such as an electric motor and gear box at 82 which may be provided with a conventional speed control knob 84.

The stratification of the break stock, and the sifting of middlings and flour from the bottom layer of the stratified stocks thus carries the brannier particles all the way to the next breaking operation and prevents them from coming in contact with the screen. Thus there is less chance for attrition and formation of finer bran dust to contaminate the sizings and middlings stock discharged at 56. Such stock can thus be fed directly to appropriate reduction steps without the necessity of intermediate purification.

While a combination of stratifying and sifting has been used in the prior art for the cleaning of wheat (see O'Brien, United States Patent 161,147), the specific application of a combination of stratification and sifting as described above for the classifying of flour milling stocks between successive breaking operations is believed to be new and to offer advantages in the processing of such stocks.

The additional electrostatic separation step shown in Fig. 5 may be used to further assist in early removal of lighter, fine branny particles or other impurities and to prevent their further attrition and more difficult later removal. The additional electrostatic separation step as applied directly to stocks which have passed through such stratification and sifting is also considered novel.

It should also be noted that the immediate feeding of the desired coarser portion of the stock from one breaking operation to the next by a single scalping operation on a single classifying surface, with less opportunity for the branny particles to pass downwardly against such surface, further contributes to maintenance of the original conditioning of the stock and minimizes the handling and attrition of the stock between breaks.

As also illustrated in Fig. 5, the break rolls 46 and 78 are preferably of known construction with hollow inner portions so that the rolls can be cooled by water or other fluid to dissipate the heat generated in the breaking operation. Thus the temperature of the stock will be held low enough to prevent undesired drying thereof. Such rolls can also be driven at higher speeds when mounted in modern anti-friction bearing supports, to provide increased capacity.

While the principles described above can be practiced to some extent with other types of sifters, such as the use of a single sifting surface in a gyratory sifter, the use of a reciprocating sifter between the breaking steps is considered particularly advantageous. The further use of such reciprocating sifters and stacked milling and sifting units for at least the initial sizings and middlings reduction steps, offers added advantages in carrying out the improved methods of the present invention.

Figure 6:
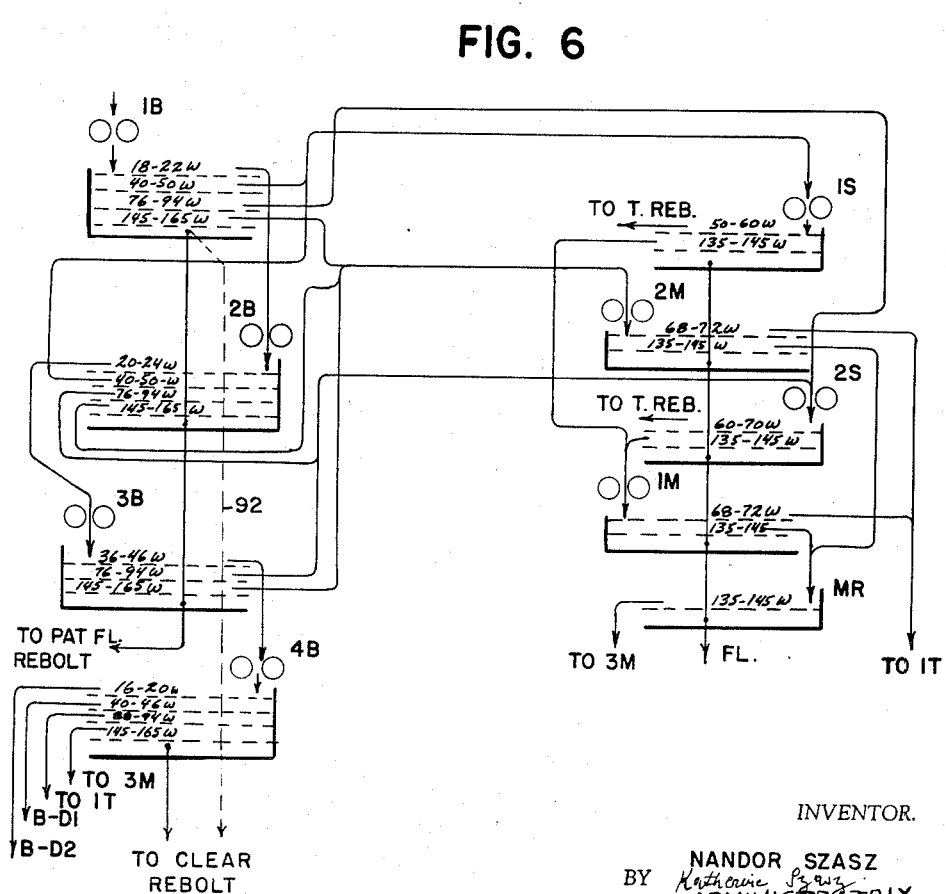
Fig. 6 is a flow sheet for a primary milling unit including sifters of the type shown in Fig. 5 for both the breaking and initial reduction steps of the process.

Fig. 6, for example, shows schematically how roller milling units and reciprocating sifters can be used to carry out four breaking and the first four sizings and middlings reduction steps. The drawing shows the steps of a single series flow corresponding to the primary portion of the flow of Fig. 4 with ranges of screen sizes suitable for reciprocating sifters of the general type shown in Fig. 5, but not including the additional electrostatic separation elements of Fig. 5. The use of reciprocating sifters as intermediate classifiers between successive roller milling units makes possible a compact installation in which handling and attrition of the stock are minimized and the desired quantities of flour may be produced at the earliest sizings and reduction steps according to the invention.

While the elements shown in Fig. 6 might be arranged in one or more stacks of the Buchholz type, the preferred arrangement involves the use of these units in balanced stacks of the improved types described and claimed in the copending applications of John Converse and myself executed and filed on the same date as this application Serial Numbers 737,011 and 737,132, entitled, Milling Apparatus in each case. As shown in my copending application, the reciprocating sifters are arranged in opposed pairs and are vibrated in counterbalancing opposition to each other. Roller mills are located in the stack for successive gravity feeding through most of the flow. By providing two units of each type, with two parallel identical flows in the breaking and initial reduction section, each of which flows is essentially identical to that shown at 86 in Fig. 4, and in detail in Fig. 6, the loads on each pair of opposed sifters can be equalized to insure minimum vibration and stress on the unit.

Thus the invention contemplates a primary milling installation in which a first stack includes two balanced primary reduction flows with up to four sizings and middlings reduction steps in each. Preferably a third stack is then added to the installation to include a single series flow for the final reduction steps of the process, i.e., those steps shown at 90, for example, in Fig. 4, starting with the third midds reduction. Thus a compact three-stack unit may be provided for the process of Fig. 4. By suitable adjustment of feed rates, roll speeds, sifting reciprocation and other factors, such a unit, with 40-inch roller mills, can readily produce from 1500–2500 cwt. of high extraction flour including a high percentage of patent flour per 24 hours of operation.

Figure 7:
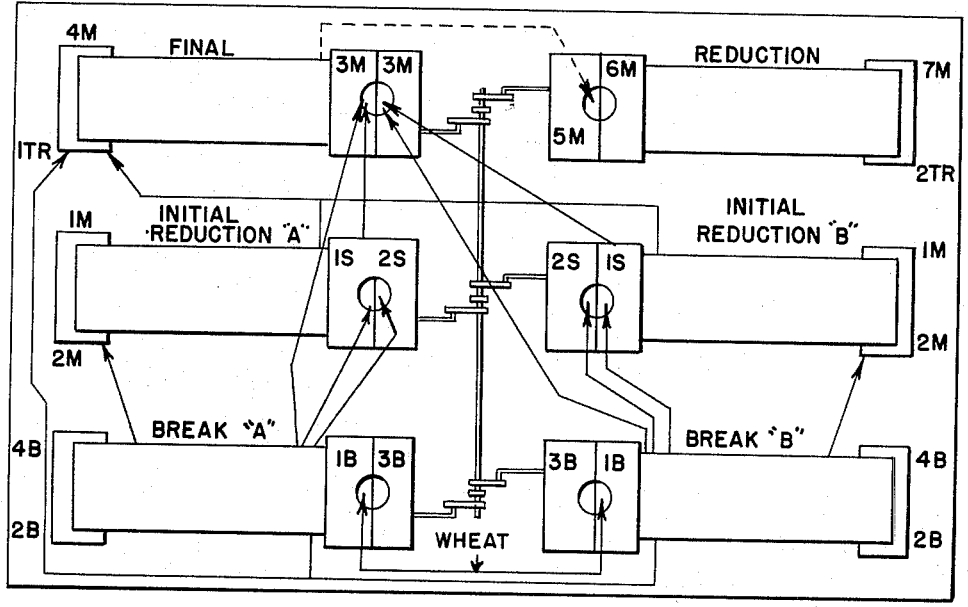
Fig. 7 is a schematic plan view of a primary mill unit including a plurality of stack units.

A three-stack unit of this type is shown schematically in plan view in Fig. 7, with a first balanced stack for parallel break flows A and B, a second such stack for balanced parallel initial reduction flows A and B, and a third balanced stack on which a single series final reduction flow is distributed, with the various loads balanced as much as practical for each pair of opposed sifters.

Figure 8:
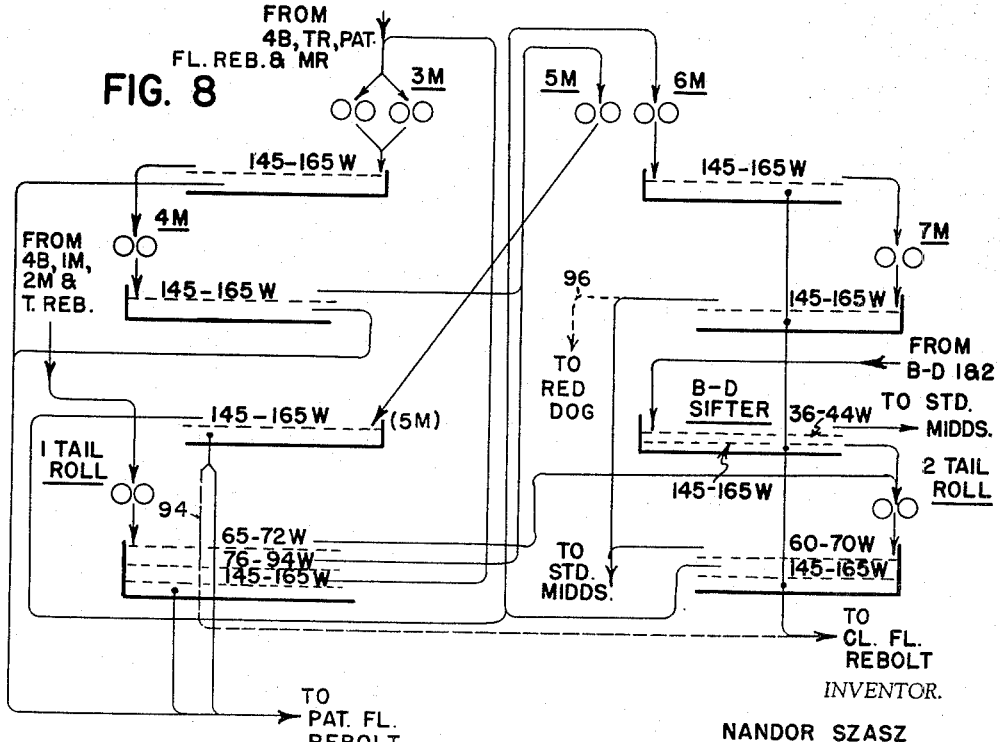
Fig. 8 is a schematic diagram of a suitable stack arrangement for the final reduction section of the device of Fig. 7.

Fig. 8 shows a suitable arrangement for the third or final reduction stack of such a three-stack unit. In this case the various final reduction and tailings rolls are located at points in the stack so that the stocks fed to opposing members of each pair of counterbalanced sifters are as nearly the same weight as possible. For example, the bran dust sifter may be included in the stack and the various other units arranged in the relative locations shown. Since there is only a single series flow through these steps, it is not possible to balance identical flows on each opposed pair. As a practical matter, the stock weights may be small compared to the weight of the sifters themselves. Hence a close approximation can be obtained with due regard for the other practical considerations involved, such as the desirability of avoiding unnecessary handling between steps and the advantages of as much direct feeding as possible, e.g., from one roll unit to a lower reciprocating sifter and then, in turn, to a still lower milling unit.

According to a further feature of this invention, an improved milling installation or system of large capacity is advantageously constructed with a plurality of primary milling units, for example of the type described above, together with suitable grain and flour storage and other facilities.

As shown in Fig. 9, a milling installation according to this invention includes a plurality of wheat storage bins 120. For convenience the individual bins are lettered A, B, C, . . . J. These storage pins are each adapted to receive a particular quantity of wheat, with wheat of a particular grade or type stored in one or more specific bins and wheat of other types in other bins.

The milling installation of Fig. 9 includes a plurality of primary mill units 122, 124, 126, and 128. Between the storage bins 120 and these primary milling units suitable feeding means 130 is provided. The feeding means is adapted to receive wheat from any one or more of the storage bins 120 and feed the wheat from such bins to one or more of the primary mill units. Thus wheat of one particular type may be fed as shown in the drawing from bin 120A to primary mill 122, wheat of another type from bin 120B to primary mill 124, wheat of a third type from bin 120I to primary mill 126 and still another type of wheat from bin 120J to primary mill 128.

As shown in Fig. 9, each primary mill may include its own cleaning system, tempering system, and major flour extraction system. Thus wheat of a particular type can be cleaned in the manner best adapted to remove its particular impurities, and can be tempered at primary unit 122 in the manner and to the degree best suited for that particular grade of wheat. The primary milling unit 122 is then used to extract the major portion of flour from the wheat and to provide as resulting products one or more grades of flour.

As indicated in Fig. 9, one grade of flour, such as high quality patent flour, may be collected from primary mill 122 and fed by suitable receiving and distributing means 132 to one or more bulk storage flour bins 134A to 134J, inclusive. In this case, the patent flour from primary mill 122 is fed to bin 134A, while another grade of flour, such as first clear flour, may be fed from mill 122 to flour storage bin 134B.

In similar fashion, the different grades of flour produced on the other primary mills 124, 126, and 128 may be collected and distributed by the means 132 as shown in Fig. 9, with the respective flour streams from mill 124 delivered to bins 134C and 134D, the flour grades from mill 126 distributed to bins 134F and 134G, and the flour streams from mill unit 128 fed to bins 134H and 134I. Since there are many known devices in the prior art by which the respective flour streams can be fed to any one or more of a desired plurality of bins 134, the details of the feeding and distributing means 132 have not been shown.

Each of the primary units of Fig. 9 may be a complete milling unit of desired capacity, for example a three-stack unit of the type shown in Fig. 7. It is also possible to omit or supplement the final reduction and tailings steps of each of such primary units and perform the final or further processing of unfinished stocks from a plurality of primary mill units in a single secondary mill unit 146. Thus, any unfinished stocks from such primary units 122, 124, 126, and 128 could be fed respectively as shown at 136, 138, 140, 142 and 144 in Fig. 11 to a secondary mill unit 146.

The use of a larger number of these primary units to feed unfinished stocks to a single secondary unit, as shown in Fig. 9 offers the possibility of collecting small amounts of certain unfinished stocks from each primary unit. Thus streams too small to justify special processing in a secondary unit fed by only one or two primary units can be obtained in large enough quantities to justify additional secondary milling to increase the total extraction or the quality of flour obtained from such stocks.

The secondary unit includes suitable apparatus for the further processing of the stock and extraction of the minor remaining portion of the flour. This secondary mill may, as indicated, be more complex than the primary mill units, depending on the additional extraction desired, or it may consist of a short final system such as the third stack unit of Fig. 7.

Whether the final reduction steps are included in the main primary units or as a separate secondary unit, it is important that each primary mill unit be designed with a relatively simple flow to extract a major portion of the desired flour in a relatively small number of easily controlled operations. The preferred size for such units involves the use of equipment and process steps adapted to produce flour in the range from 750 to 2500 cwt. (cwt.=100 pounds) for each 24 hours of operation per primary mill.

In addition to greater ease of controlling such a unit, the milling system shown in Fig. 9 has the further advantage that each grade of wheat can be milled in a single unit of limited capacity under conditions which are optimum for that particular wheat grade. Thus each grade of wheat can be most effectively milled to produce the different final grades of flour.

The different grades of flour, in turn, can be blended in desired proportions to provide a finished flour the characteristics of which depend on the blend of different characteristics in the individual flour streams. Thus the bulk storage bins 134 are associated with suitable collecting conveyors 148 and 150, to which flour from any one or more desired bins can be fed by suitable valves 152 on the individual bins. Conveyors 148 and 150 in turn feed their respective streams at desired rates to a blending unit of desired construction shown schematically at 154. The blended flour may be chemically treated at 56 and then packed at 158 for final shipment and sale. As indicated by the double arrows between units 154, 156 and 158, different composite or individual flours may be separately blended or treated to achieve the various desired characteristics.

The wheat germ, which is part of the kernel of wheat, may be segregated from the other products, if desired, in known manner either at appropriate points in the process or by preliminary steps preceding the process of the present invention.

The methods and apparatus described above make it possible to extract the major portion of flour from wheat and other cereal grains in a minimum number of operating steps in a primary mill unit of relatively simple construction and low investment cost, with maximum use of individual or parallel series flows which can be readily controlled and balanced by an operator with minimum training. Such units can extract a high percentage of high quality flour equal to, or better than, the best extractions of prior art mills and processes of much greater complexity. In other words, if such units are operated to produce the same percentage extraction as a conventional prior art mill, a higher quality (e.g. lower ash) flour can then be obtained. Or if such units are operated to produce the same quality flour as such a prior art mill, a higher percentage extraction of that quality can be obtained.

While various theories may be advanced to account for the improved results of this invention, the production of clean middlings during the breaking steps of this process and their early reduction to high quality flour are believed to be facilitated by maintenance of proper conditioning of the stock. The relatively short flow, the possibility of eliminating air purifiers, and the reduced time of processing of the stocks contribute to maintenance of the conditioning which was achieved in the original tempering operation further prevent the undesirable attrition and drying of the stocks and the formation of many fine particles of bran. The maintenance of such conditioning may also be aided by the use of water cooled rolls of known construction which can be maintained at moderate temperature ranges even when operated at high speeds for increase capacity. The cooling of the rolls prevents formation of excessive heat during the breaking and reduction steps and thus avoids the driving off of moisture which could otherwise result from the increase in temperature of stock during such operations. Regardless of the possible theories, however, the fact remains that use of the combinations of improved methods and apparatus described herein, some of the features of which are individually old in the art, can give the indicated superior results in the milling of flour from cereal grains, with compact units of lower cost.

The advantages of milling with a plurality of such primary units, which require relatively low investments in plant and equipment, offer greater ease of maintenance and control, and are adaptable to separate bulk storage of the flour produced from different grades of wheat by such units, and to blending and further treatment of selected flour grades to produce composite final products of desired baking and other special characteristics will be apparent from this description.

The foregoing specification sets forth the nature and principles of this invention, together with some of the ways in which the invention may be practiced.

Now, therefore, I claim:

1. The method of milling flour from wheat on a commercial scale of at least 750 cwt. of flour per 24 hours of operation which comprises feeding cleaned, tempered wheat through a series of breaking steps including, classifying the stock at each break and thereby segregating the different size ranges of middlings and sizings stock produced, subjecting said different size ranges to appropriate sizings reduction and middlings reduction steps including appropriate further classification, and controlling the breaking and reduction steps to extract an amount of flour equal to at least substantially half of the clean, tempered wheat weight in the first six operating steps of the process.

2. The method of milling according to claim 1 in which the breaking and reduction steps are controlled to produce flour in an amount equal to substantially two-thirds of said wheat weight in said first six operating steps.

3. The method of milling according to claim 1 in which said first six operating steps include the initial reduction of all of said different size ranges of middlings stocks from at least the first three breaking steps.

4. The method of claim 2 in which the middlings stocks are fed directly from said first three breaking steps to said initial reduction steps without intermediate air purification.

5. The method of milling flour from wheat which comprises feeding cleaned tempered wheat through a series of breaking steps at each of which the different size ranges of middlings and sizings stock are segregated, feeding to a first reduction step the coarsest sizings and middlings stock from at least the first two breaking steps of said series in an amount equal to at least 15% of the weight of initial feed to the first break, and controlling said breaking and reduction steps in a manner producing flour from said stock at said first reduction step in an amount equal to at least 5% of said initial feed to first break.

6. The method of claim 5 in which the flour produced at said first reduction step equals substantially 10% of said initial feed.

7. The method of claim 5 in which only the coarsest sizings and middlings stock from the first two breaking steps is fed to said first reduction step.

8. The method of claim 7 in which the amount of said coarsest stock fed to said first reduction step from said first two breaks is substantially one-fourth of the weight of said initial feed.

9. The method of claim 5 in which medium middlings including the next coarsest middlings from at least the first two breaking steps are fed to a second reduction step in an amount equal to at least 15% of the weight of initial feed to first break, and in which the second reduction step is controlled to produce flour from said stock at said second reduction step in an amount equal to at least 10% of said initial feed.

10. The method of claim 9 in which only the coarsest middlings and sizings stocks from the first two breaks are fed to said first reduction step and in which only the second coarsest middlings stock from said first two breaks and the coarsest middlings stock from the third break are fed to said second reduction step.

11. The method of milling flour from wheat on a commercial scale of at least 750 cwt. of flour per 24 hours of operation which comprises feeding cleaned, tempered wheat through a series of breaking steps at each of which the different size ranges of middlings and sizings stock are segregated, feeding to a first reduction step the coarsest sizings and middlings stock from the first two breaks in an amount equal to at least 15% of the initial feed to the first break, controlling the breaking and first reduction steps and thereby producing flour from said stock at said first reduction step in an amount equal to at least 5% of said feed to first break, feeding to a second reduction step the second coarsest sizings and middlings separation from the first two breaks and the coarsest sizings and middlings separation from the third break in an amount equal to at least 15% of said feed to first break, further controlling the breaking and second reduction steps and thereby producing flour from said stock at said second reduction in an amount equal to at least substantially 10% of the said initial feed to first break, feeding at least the majority of the middlings from the first two reductions to a third reduction step, and further controlling the third reduction step and thereby producing flour at said third reduction step equal to at least 10% of said feed to first break.

12. The method of milling according to claim 11 which includes the further steps of feeding to a fourth reduction step the finer middlings stocks from the earlier breaks in an amount equal to at least 15% of said initial feed to first break and further controlling the break and fourth reduction steps and thereby producing flour at said fourth reduction step in an amount equal to at least 10% of said initial feed.

13. The method of milling according to claim 12 in which the first three breaking steps and said first four reduction steps are controlled to produce total flour from said steps in an amount equal to at least half the weight of the initial feed to first break.

14. The method of milling flour from wheat which comprises feeding clean tempered wheat through a series of breaking steps at each of which the different size ranges of middlings and sizings stocks are segregated, feeding to a first reduction step the coarsest sizings and middlings stock from at least the first two breaking steps in an amount equal to at least 15% of the weight of initial feed to the first break, controlling the breaking and first reduction steps and thereby producing flour from said stock at said first reduction step in an amount equal to at least 5% of said initial feed, feeding to a second reduction step a medium middlings stock including at least the second coarsest middlings stock from said first two breaking steps in an amount equal to at least 15% of said initial feed, further controlling the breaking and second reduction steps and thereby producing flour from said stock at said second reduction step in an amount equal to at least 10% of said initial feed, feeding to another reduction step only the finer middlings stock from the first three breaks in an amount equal to at least 15% of said initial feed, and further controlling said another reduction step and thereby producing flour from said stock at said another reduction step in an amount equal to at least 10% of said initial feed.

15. The method of milling according to claim 14 which includes feeding to said first reduction step only the coarsest middlings and sizings stock from the first two breaks, feeding to said second reduction step only the next coarsest middlings stock from the first two breaks and the coarsest middlings from the third break, feeding to said another reduction step only the finer middlings stock from said first three breaks, feeding to a further reduction step at least a majority of the remaining middlings stock from the first two reduction steps, and controlling said further reduction step and thereby producing flour from the stock at said further reduction step in an amount equal to at least 10% of said initial feed.

16. The method of milling according to claim 15 in which the feed to said first reduction step is substantially 25% of said initial feed to first break, and the total feed to said first, second and another reduction steps is substantially 70% of said initial feed.

17. The method of classifying and purifying flour milling stocks produced in a breaking step to separate the flour and middlings stock produced in said breaking steps from the remaining coarser branny hull portions, which method comprises stratifying all of the material produced at said break to provide layers of material in which the branny hull portions are carried in an upper layer and the middlings stock and flour particles in a lower layer, maintaining the stratification of said layers while feeding the material over a sifting surface and sifting flour and middlings from the lower layer, terminating the sifting before the thickness of the lower layer is reduced sufficiently to permit substantial contact and attrition of the upper layer of branny hull portions against the sifting surface, and feeding the remaining unsifted material from said break step directly to a succeeding break.

18. A flour milling process which includes at least four breaking steps and in which the material is similarly stratified and sifted according to the method of claim 17 between each two successive breaking steps.

19. A flour milling process according to claim 18 which includes a plurality of breaking steps with appropriate classification to segregate different grades of middlings, and a plurality of reduction steps at which the segregated middlings are reduced to flour, and in which the material is similarly stratified and sifted after each of the breaking steps and at least the first four reduction steps.

20. The method of classifying according to claim 17 in which one of the stocks obtained by said stratifying and sifting steps is subjected to an electrostatic separation step.

21. A milling process according to claim 18 in which the system is operated at a capacity of at least 750 cwt. of flour per 24 hours, and in which middlings stocks are separated in the sifting step after each of at least the first two breaks, and said middlings stocks are all fed directly to appropriate reduction steps without purification.

22. A flour milling installation which includes a plurality of processing machine units adapted to provide a sequence of breaking steps and a sequence of reduction steps with intermediate classification steps in each sequence, said installation including breaking and classifying units located and arranged to provide a single series flow at the end of the reduction sequence and at least two identical series flows arranged in parallel with each other at the start of said breaking sequence, each of said parallel series flows including only a single machine unit of each desired type at each of at least three steps of the series flow, said units being connected for feeding each stream of a particular material discharged from each machine unit in each series to not more than one subsequent machine unit of a given type at a subsequent step and thereby eliminating distribution of any such stream to more than one processing machine unit at the next step of the installation.

23. A flour milling installation according to claim 22 having at least four breaking steps and eight reduction steps, each of the parallel starting flows including at least three breaking and four reduction steps.

24. A flour milling installation according to claim 22 having only two parallel series flows through the initial breaking and reduction steps.

25. A flour milling system according to claim 24 having at least four breaking steps and eight reduction steps, each of said two series flows arranged in parallel extending through said four breaking steps and at least the first four and not more than the first five of said reduction steps.

26. A flour milling installation which includes a plurality of processing units adapted to provide a sequence of breaking steps and reduction steps with intermediate classification, said installation including roller mill units and reciprocating stratifying and sifting units arranged to provide a single series flow at the final reduction steps and only two series flows arranged in parallel with each other from the start of said breaking steps to an intermediate reduction step, each of said series flows including only a single roller milling unit for each breaking and reduction step in the series, at least one reciprocating stratifying sifter between each two successive break roller mill units and each two successive reduction roller mill units in each series, said break rolls and sifters being located and arranged so that each sifter in each break series is fed only by the stream of material discharged from a single preceding break roller unit, and in turn feeds a given stock to only on subsequent roller mill unit at a given stage in the series, each of said sifters including means for separating the flour and middlings stock produced by the preceding rolls, means for feeding the respective middlings directly to the appropriate reduction roller milling units at a subsequent step of the installation according to size and grade, and means combining similar streams discharged from similar machine units of said parallel flows at a point in the reduction portion of the installation where the combined streams have a volume rate of flow within the capacity of a single machine unit at the next step of the installation and thereby establishing the start of said final series flow at said last mentioned unit.

27. A primary flour milling installation comprising a plurality of processing machine units, and means feeding material from unit to unit to provide at least four breaking steps and four middlings reduction steps with intermediate classification, said machine units and feeding means providing a plurality of identical series flows arranged in parallel with each other and each of which includes a single pair of rolls for each breaking and reduction step and at least one reciprocating stratifier and sifter between each successive pair of breaking rolls and each successive pair of reduction rolls, said break rolls and sifters being located and arranged so that each such sifter is fed only by stock from the preceding single pair of break rolls and in turn feeds directly to the next processing machine unit, each of said sifters including means for separating the flour produced by the preceding rolls and means for also separating any middlings so produced, and means feeding the respective middlings from each sifter directly to the appropriate reduction rolls at a subsequent reduction step according to size and grade.

28. A grain milling installation having a plurality of primary mill units each of which includes a series of breaking units and reduction units with associated intermediate classifying units for extraction of the major portion of the grain as flour, each primary mill having at least one single series flow through at least the first three breaking and first four reduction steps of a flour milling process with only a single milling machine at each such step in said series flow, and a secondary mill unit connected to receive unfinished stock from at least two of said primary mill single series flows, said secondary mill unit having a series of associated processing machines for extraction of the remaining minor portion of flour.

29. A flour milling installation according to claim 28 having storage means for a plurality of different grades of grain, means for simultaneously feeding one grain grade from said storage means to one primary milling system unit and another grain grade from the storage means to another primary milling unit, bulk flour storage means including a plurality of separate bins for different grades of flour, means for feeding the flours produced from said primary mills to separate bins according to theirf respective grades, and means for selectively blending desired amounts of flour from different predetermined bins and thereby providing a final flour product of desired quality and composition.

30. A flour milling installation according to claim 29 having means for feeding additional flour produced on said secondary unit to appropriate storage bins according to flour grade.

31. A flour milling installation according to claim 29 having a separate grain cleaning system for each primary milling unit and means for feeding each particular grain grade from its storage means in series through the cleaning system and tempering system associated with the primary milling unit on which that grain grade is to be milled, thereby providing optimum adjustment of all processing steps for each grain grade.

32. A flour milling installation according to claim 29 having means for feeding a particular grain grade from its storage means simultaneously through a plurality of said primary milling units, each of which is readily balanced at optimum adjustment for that grain grade.

33. A flour milling installation according to claim 28 in which each of said primary milling units has power and control means adapted for independent operation, thereby providing for stoppage and maintenance work on one desired unit during continued operation of said other units and facilitating separate adjustment and balancing of each unit.

34. A grain milling installation comprising a primary mill having at least two stacked grain milling units, each of which comprises four vertically spaced pairs of opposed reciprocating sifters and four pairs of milling machines positioned to feed stocks in duplicate parallel flows to the respective sifters of said pairs, and all but the first pair of milling machines being connected to receive stocks from respective sifters of a preceding pair, the first unit having four pairs of break milling units, one pair for each of first, second, third and fourth break operations, with a pair of classifiers following each break operation, and the second unit having four pairs of reduction milling units, one pair for each of first, second, third and fourth reduction operations, means for feeding desired middlings stocks from each of the classifiers of a given pair in said first unit to one of the reduction milling units of a given pair in said second unit, and means for feeding similar middlings stock from the other classifier of said given pair in the first unit to the other reduction milling unit of said given pair in the second unit.

35. A grain milling installation according to claim 34 having a secondary mill comprising a third stacked unit, said third unit including a pair of reduction milling units for the fifth reduction operation, six individual roller milling units, for sixth, seventh, eighth and ninth middlings reduction operations and for first and second tailings grinding operations, a plurality of pairs of opposed and aligned reciprocating classifiers, means for combining appropriate stocks from desired pairs of classifiers in said first and second units and feeding said stocks to appropriate milling units of said third stack unit.

References Cited in the file of this patent

UNITED STATES PATENTS

| 682,189 | Green | Sept. 10, 1901 |
| 2,392,365 | Carter | Jan. 8, 1946 |
| 2,615,570 | Morrison | Oct. 28, 1952 |
| 2,803,344 | Morrison | Aug. 20, 1957 |

FOREIGN PATENTS

| 241,645 | Great Britain | Oct. 29, 1925 |
| 874,473 | France | May 4, 1942 |
| 1,033,764 | France | Apr. 8, 1953 |

OTHER REFERENCES

"Flour Milling Processes" by J. H. Scott, published 1951 by Chapman and Hall, Limited, London, England, 1951, Patent Office Library No. TS 2,145,853, 1951, pages 374–375, Figure 51 facing page 206.

(Other references on following page)

OTHER REFERENCES

"Flour Milling" by Kozmin. Translated from the Russian by Falkner and Fjelstrup, published by George Rouledge and Sons, Limited, London, England, 1917, Patent Office Library No. TS–2,145,K88FE, pages 528–30 including Figure 511.

How we make you succeed etc., Anglo American Mill Company publication, Owensboro, Kentucky, about 1920, pages 5, 6 and 13.

The Weather Vein, volume 8, number 3, published by Carrier Engineering Company, 1928, Figure 2 on page 20, and Figure 1, pages 24–25.